(12) United States Patent  
Ahn

(10) Patent No.: US 6,480,453 B2
(45) Date of Patent: Nov. 12, 2002

(54) APPARATUS AND METHOD FOR DRIVING AN OPTICAL DISC WITH A CADDY HAVING A COVER

(75) Inventor: Cheol-woong Ahn, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/794,078

(22) Filed: Feb. 28, 2001

(65) Prior Publication Data

US 2001/0010674 A1 Aug. 2, 2001

Related U.S. Application Data

(62) Division of application No. 09/188,363, filed on Nov. 10, 1998.

(51) Int. Cl.[7] .............................................. G11B 33/02
(52) U.S. Cl. ...................................................... 369/75.2
(58) Field of Search .............................. 369/75.2, 75.1, 369/77.1, 77.2, 244, 249; 360/99.02, 99.03, 99.06, 99.07

(56) References Cited

U.S. PATENT DOCUMENTS

| | | | |
|---|---|---|---|
| 4,825,429 A | 4/1989 | Matsumoto | 369/75.2 |
| 5,023,862 A | 6/1991 | Kim | 369/215 |
| 5,140,489 A | 8/1992 | Barnard | 360/133 |
| 5,485,330 A | 1/1996 | Hirose et al. | 369/99.06 |

(List continued on next page.)

FOREIGN PATENT DOCUMENTS

| | | |
|---|---|---|
| EP | 0 315 255 A1 | 5/1989 |
| EP | 0 518 259 A1 | 12/1992 |
| EP | 0 609 617 A2 | 8/1994 |
| EP | 0 645 768 A2 | 3/1995 |
| EP | 0 855 709 A1 | 7/1998 |
| JP | 62-262258 | 11/1987 |
| JP | 1-150268 | 6/1989 |
| JP | 1-177455 | 12/1989 |
| JP | 3-76244 | 7/1991 |
| JP | 4-286760 | 10/1992 |
| JP | 5-234207 | 9/1993 |
| JP | 6-349179 | 12/1994 |
| WO | WO98/14941 | 4/1998 |

Primary Examiner—Hoa T. Nguyen
Assistant Examiner—Tianjie Chen
(74) Attorney, Agent, or Firm—Staas & Halsey LLP

(57) ABSTRACT

An optical disc driving apparatus requiring a fewer number of parts, simpler structure, less assembly cost, to those result in a lower product price. The optical disc driving apparatus includes a base plate, on which a spindle motor and a pickup unit are mounted, is moved to optical disc loading and chucking positions together with a caddy by physical force exerted to the caddy inserted into the deck base. The base plate is locked by a locking unit and positioned. In this situation, information is recorded and/or reproduced on/from the optical disc. In an ejection mode, the pickup unit is moved in a radial direction of the optical disc so that the base plate is unlocked and is moved to the initial position for unloading of the optical disc. Here, the physical force is a pressing force exerted by a user. Accordingly, the optical disc driving apparatus can be of a compact-size, and conveniently utilized as a caddy-type as well as a tray-type.

20 Claims, 16 Drawing Sheets

U.S. PATENT DOCUMENTS

| | | | | |
|---|---|---|---|---|
| 5,528,567 A | * | 6/1996 | Kim | 369/37 |
| 5,623,381 A | | 4/1997 | Sawada et al. | 369/97.01 |
| 5,691,969 A | * | 11/1997 | Fujisawa | 369/77.1 |
| 5,724,332 A | | 3/1998 | Ogusu | 369/77.2 |
| 5,732,063 A | * | 3/1998 | Chen | 369/263 |
| 5,808,996 A | | 9/1998 | Aoyama | 369/77.1 |
| 5,841,756 A | | 11/1998 | Shihoh | 369/192 |
| 5,878,012 A | | 3/1999 | Watanabe et al. | 369/75.2 |
| 5,892,747 A | | 4/1999 | Okada et al. | 369/75.1 |
| 5,943,309 A | * | 8/1999 | Watanabe | 369/77.1 |
| 5,978,340 A | | 11/1999 | Tanaka et al. | 369/75.2 |
| 6,002,658 A | * | 12/1999 | Aso et al. | 369/75.1 |
| 6,011,766 A | * | 1/2000 | Nguyen et al. | 369/77.1 |
| 6,018,433 A | | 1/2000 | Thayne et al. | 369/69 |
| 6,021,108 A | | 2/2000 | Arai et al. | 369/244 |
| 6,111,196 A | | 8/2000 | Arai | 174/50 |
| 6,111,838 A | | 8/2000 | Akiba | 369/771 |
| 6,154,430 A | * | 11/2000 | Son | 369/75.2 |
| 6,160,781 A | * | 12/2000 | Koshino et al. | 369/75.2 |
| 6,229,781 B1 | * | 5/2001 | Fujisawa | 369/77.1 |
| 6,278,677 B1 | * | 8/2001 | Sako et al. | 369/77.1 |

* cited by examiner

APPARATUS AND METHOD FOR DRIVING AN OPTICAL DISC WITH A CADDY HAVING A COVER

CROSS-REFERENCE TO RELATED APPLICATIONS

This application is a divisional of application Ser. No. 09/188,363, filed Nov. 10, 1998, now pending.

BACKGROUND OF THE INVENTION

1. Field of the Invention

The present invention relates to an apparatus for driving an optical disc, in which information is recorded and/or reproduced on/from an optical disc by optical means, and more particularly, to an apparatus for driving an optical disc and a method thereof which employs a manual-type disc loading structure.

2. Description of the Related Art

Generally, an optical disc driving apparatus includes a deck base, loading/unloading means, a rotation means, and recording/reproducing means. The deck base forms a body of the optical disc driving apparatus. The loading/unloading means loads or unloads the optical disc onto/from the deck base. The rotation means rotates the optical disc loaded by the loading/unloading means. The recording/reproducing means records and/or reproduces information on/from the optical disc, while traveling in a radial direction of the optical disc which is rotated by the rotation means. Here, the optical disc may be loaded or unloaded while mounted on a tray. There are various types of optical disc driving apparatuses such as one having the optical disc received into a caddy or a cartridge to be inserted or withdrawn into/from the deck base, etc. A spindle motor is generally used as the rotation means, and a pickup unit is used as the recording/reproducing means.

FIG. 1 shows a conventional tray-type optical disc driving apparatus. As shown in FIG. 1, the optical disc driving apparatus includes a deck base 1, a base plate 10 on which the spindle motor and pickup unit are mounted, a tray 20 on which an optical disc D is mounted, tray moving means 30, base plate raising and lowering means 40, and an upper cover 50.

The deck base 1 is provided with a pair of sidewalls 2 and 3, a rear wall 4, and a front bottom 5 which has a predetermined width. A pair of holes 6a and 6b are defined at a rear portion of the sidewalls 2 and 3.

The base plate 10 has a pair of hinge projections 11a and 11b formed at both rear ends thereof, respectively. The base plate 10 is movably mounted on the deck base 1 by the hinge projections 11a and 11b which are respectively inserted into the holes 6a and 6b of the deck base 1. A spindle motor 12 and a pickup unit 13 are mounted on the base plate 10. The spindle motor 12 has a turntable 12a onto which a disc D is positioned. The pickup unit 13 has an optical head 13a. The spindle motor 12 is attached on the base plate 10 and adjacent to a longitudinal opening 10a of the base plate 10, and the pickup unit 13 is movably disposed at a pair of guiding shafts 14a and 14b which lie across the longitudinal opening 10a in parallel relation to each other. Additionally, a stepping motor 15 is installed at a side of the base plate 10, and a lead screw 15a is installed at the stepping motor 15 in parallel relation to the guiding shafts 14a and 14b. The lead screw 15a is engaged with a guiding holder 13b which is formed at a side of the pickup unit 13. Accordingly, when the stepping motor 15 is rotated in one direction and a reverse direction thereof, the pickup unit 13 is moved along the guiding shafts 14a and 14b.

The tray 20 is disposed on an upper side of the deck base 1 and is capable of being inserted and withdrawn with respect to the deck base 1. A receiving opening 20a is defined approximately at the middle portion of the tray 20 to receive the spindle motor 12, and a longitudinal opening 20b is so designed as to intercommunicate with the receiving hole 20a and to expose the recordable surface of the optical disc D mounted on the tray 20 to the pickup unit 13. Additionally, a rack gear 21 is disposed on a lower surface of the tray 20 in a lengthwise direction of the tray 20, and an operation member 22 having a cam groove is disposed adjacent to the receiving opening 20a.

The tray moving means 30 is provided on the bottom 5 of the deck base 1, and the base plate raising and lowering means 40 is such constructed to operate together with the tray moving means 30.

The tray moving means 30 is provided with the rack gear 21 disposed on the tray 20, a pinion 31, and a motor 32 which generates a driving force. The pinion 31 is rotatably disposed on the bottom of the deck base 1 by a shaft. The motor 32 is disposed on a lower surface of the bottom 5 of the deck base 1 and a driving shaft of the motor 32 protrudes upward through the bottom 5 of the deck base 1. The driving force of the motor 32 is transmitted to the pinion 31 via gear train 33. The gear train 33 has a first gear 33a fixed to the driving shaft of the motor 32, a second gear 33b engaged with the first gear 33a, a third gear 33c integrally formed with the second gear 33b, a fourth gear 33d engaged with the third gear 33c, a fifth gear 33e integrally formed with the fourth gear 33d, and a sixth gear 33f integrally formed with the pinion 31 to be engaged with the fifth gear 33e. Here, when the motor 32 is rotated in the clockwise direction, the tray 20 is advanced so as to be inserted into the deck base 1. When the motor 32 is rotated in the counterclockwise direction, the tray 20 is retracted so as to be withdrawn from the deck base 1.

The base plate raising and lowering means 40 has a slide member 41 and a pivot lever 42. The slide member 41 is disposed in an inner side of the bottom 5 of the deck base 1 so as to be moved in perpendicular relation to the direction which the tray 20 is moved toward. The pivot lever 42 is disposed on the bottom 5 of the deck base 1 by a shaft, while connected to an end of the slide member 41.

A pair of cam grooves 41a and 41b are defined at a side surface of the slide member 41. A pair of operation projections 16a and 16b are projected from the front surface of the base plate 10 while being spaced from each other at a predetermined distance. The operation projections 16a and 16b are inserted into the cam grooves 41a and 41b. Additionally, a rack 41c is formed at the other side of the slide member 41. The rack 41c is selectively engaged with the sixth gear 33f of the gear train 33. Accordingly, when the sixth gear 33f is rotated in one direction and the reverse direction thereof and is engaged with the rack 41c, the slide member 41 is moved. Initially, when the tray 20 is not inserted into the deck base 1, the rack 41c is not engaged with the sixth gear 33f, but spaced therefrom by a predetermined distance.

Further, a projection 41d is formed on an upper portion of the slide member 41. When the tray 20 is inserted into the deck base 1, the projection 41d is inserted into the cam groove of the operation member 22 which is formed on the tray 20. Due to the projection 41d being inserted into the cam groove of the operation member 22, the slide member 41 is slightly moved when the tray 20 is inserted. Accordingly, the rack 41c of the slide member 41 is engaged with the sixth gear 33f, and as the sixth gear 33f is rotated, the slide member 41 is continuously moved. Due to the slide member 41 being moved, the operation projections 16a and 16b of the base plate 10, which are positioned at a lower portion of the cam grooves 41a and 41b, are raised along the inclined surfaces of the cam grooves 41a and 41b to be positioned at the upper ends of the cam grooves 41a and 41b. By the rising motion of the base plate 10, the optical disc D mounted on the tray 20 is put on the turntable 12a of the spindle motor 12 to be rotated by the turntable 12a.

Meanwhile, the pivot lever 42 has a slider 43 which is inserted into a boss 41e of the slide member 41. The slider 43 is accommodated at an opening of the pivot lever 42. A spring 44 for elastically supporting the slider 43 is disposed in the opening. Due to the presence of the slider 43 and the spring 44, the slide member 41 maintains its initial state, in which the rack 41c and the sixth gear 33f are spaced apart from each other.

A clamp assembly 51 is provided on the cover 50, to be moved in response to the insertion of the tray 20, and to press against a hub of the optical disc D.

Hereinafter, the operation of the conventional tray-type optical disc driving apparatus will be described with reference to FIGS. 2 to 5.

FIG. 2 is a plan view of the deck base 1 showing the state when the disc is unloaded, that is, the tray 20 is withdrawn from the deck base 1, and FIG. 3 is a sectional view of FIG. 2 for showing the position of the base plate 10 when the tray is withdrawn.

As shown in FIG. 2, the tray 20 is completely withdrawn out of the deck base 1, and the slide member 41 is moved leftward. The rack 41c of the slide member 41 and the sixth gear 33f of the gear train 33 are spaced apart from each other, and the operation projections 16a and 16b of the base plate 10 are positioned at the lower ends of the cam grooves 41a and 41b of the slide member 41. Thus, the base plate 10 is in a lowered position.

Then, when the tray 20 on which the optical disc D is mounted is manually pushed or when a separate loading switch is pushed, the loading motor 32 is driven so that the tray 20 is advanced. Accordingly, the tray 20 is inserted into the deck base 1.

When the tray 20 is almost inserted into the deck base 1, and more specifically, when the operation member 22 of the tray 20 and the projection 41d of the slide member 41 are so placed as to be in contact with each other, the projection 41d is inserted into the cam groove of the operation member 22 to move the slide member 41 toward the right side of FIG. 2. Accordingly, the rack 41c of the slide member 41 and the sixth gear 33f of the gear train 33 are engaged with each other, and the slide member 41 is further moved rightward along with the tray 20 which is advanced. Continuously, the operation projections 16a and 16b of the base plate 10 positioned at the lower ends of the cam grooves 41a and 41b of the slide member 41 are moved along the inclined surfaces of the cam grooves 41a and 41b to be positioned at the upper ends of the cam grooves 41a and 41b so that the base plate 10 is raised.

FIGS. 4 and 5 are a plan view and a sectional view of the deck base 1, respectively, showing the state when the tray 20 is inserted in the deck base 1, that is, the disc D is loaded in the deck base 1.

As shown, the tray 20 is inserted into the deck base 1, and the slide member 41 is on the right side of FIG. 4. Further, the operation projections 16a and 16b of the base plate 10 are positioned at the upper ends of the cam grooves 41a and 41b of the slide member 41 so that the base plate 10 is maintained in a raised position.

By the rising motion of the base plate 10, the optical disc D mounted on the tray 20 is chucked on the turntable 12a of the spindle motor 12, while simultaneously clamped by the clamp assembly 51 of the cover 50. In such a situation, the spindle motor 32 is driven so that the optical disc D is rotated at a predetermined speed. Further, due to the stepping motor 15 being driven, the pickup unit 13 is moved in a radial direction of the optical disc D and records/reproduces information on/from the optical disc D.

Meanwhile, when the eject button is pushed to withdraw the optical disc D whose information recording/reproducing is completed, the loading motor 32 is driven in the reverse direction so that the tray 20 is withdrawn. Simultaneously, the slide member 41 which is engaged with the sixth gear 33f of the gear train 33 is moved toward a left side of FIG. 4. Accordingly, the operation projections 16a and 16b of the base plate 10 inserted into the cam grooves 41a and 41b of the slide member 41 are moved along the inclined surface of the cam grooves 41a and 41b to be positioned at the lower ends of the cam grooves 41a and 41b so that the base plate 10 is lowered. Also, the tray 20 is completely withdrawn from the deck base 1. Then, after the optical disc D is replaced, if the separate loading switch is pushed or the tray 20 is manually pushed, the tray 20 is inserted into the deck base 1 according to the disc loading process as described above.

The conventional optical disc driving apparatus, however, has a drawback in that it has structures for loading or unloading the optical disc D and for raising and lowering the base plate 10 using the loading motor 32, thereby requiring many parts and resulting in a complex structure of the product. Since many parts are required for the conventional optical disc driving apparatus, the manufacturing cost and process are increased. Also, since many parts are required, a reduction in the size of the product is limited.

SUMMARY OF THE INVENTION

The present invention has been made to overcome the above-mentioned problems, and accordingly, it is an object of the present invention to provide an optical disc driving apparatus employing a manual-type disc loading structure instead of using a loading motor, by which the number of parts is reduced, structure is simplified, and the product price can be reduced.

Another object of the present invention is to provide an optical disc driving apparatus having relatively less number of parts, which results in a much smaller product.

A further object of the present invention is to provide an optical disc driving apparatus capable of being utilized as a caddy-type as well as a tray-type.

Another object of the present invention is to provide a method for driving an optical disc for performing manual-type disc loading/unloading processes without using a loading motor.

Yet another object of the present invention is to provide a method for driving an optical disc, by selecting one of the caddy-type optical disc or tray-type optical disc, respectively.

The above and other objects of the present invention mentioned above are accomplished by an optical disc driving apparatus in which a base plate on which disc rotation means and an optical device are mounted is moved to optical loading and chucking positions together with a caddy by physical force exerted to the caddy which is inserted into the deck base. The base plate so moved is locked by locking means and positioned thereat. In such a situation, information is recorded and/or reproduced on/from the optical disc by the optical disc rotation means and the optical device. The base plate is moved to its initial position by manipulating an eject button for unlocking the base plate.

Here, the physical force is a pressing force exerted by a user. Further, the optical disc rotation means is a spindle motor having a turntable, and the optical device is a pickup unit having an optical head.

The optical disc driving apparatus according to the present invention includes means for guiding the movement of the base plate to the optical disc loading and chucking positions. The guiding means includes a pair of sliding holes respectively defined at rear portions of both sidewalls of the deck base, facing each other; a pair of cam grooves having inclined surfaces of a predetermined degree, formed at the front portions of both sidewalls of the deck base, respectively, while facing each other; a pair of first guiding projections formed at both rear portions of the base plate, respectively, to be inserted into the sliding holes; and a pair of second guiding projections formed at both front portions of the base plate, respectively, to be inserted into the cam grooves.

The base plate locking means includes a locking hole defined at a side surface of the base plate; a locker having a locking lever to be selectively inserted into the locking hole, and pivotally mounted to the deck base by a pin; and a spring disposed at the pin of the locker, to elastically support the locker in a counterclockwise direction.

The ejection means includes means for unlocking the base plate; and elastic means for elastically supporting the base plate so as to return the base plate to the initial position in response to the unlocking of the base plate. Here, a rear end surface of the caddy is locked with a pair of locking projections formed at a rear portion of the base plate so that the caddy is withdrawn while the base plate is moved to the initial position. Further, the unlocking means includes an unlocking projection formed at an upper surface of a locking piece which is integrally formed at the locker; and an unlocking lever integrally formed at the pickup unit to be selectively in contact with the unlocking projection, to push the unlocking projection in response to the movement of the pickup unit so as to rotate the locker. The pickup unit is rapidly moved in a radial direction of the optical disc in the ejection mode. Due to the pickup unit which is such moved, the unlocking projection of the locker is pushed by the unlocking lever, and accordingly, the locker is rotated to unlock the base plate.

According to one preferred embodiment of the present invention, an optical disc driving apparatus includes a deck base, a caddy on which an optical disc is mounted, and a base plate on which a spindle motor and a pickup unit are mounted. The deck base has a pair of sliding holes and a pair of cam grooves. The caddy is inserted into the deck base by physical force. The base plate is supported by the sliding holes and the cam grooves. Further, the base plate is elastically supported by a pair of springs in one direction. Accordingly, when a physical force is exerted to the base plate, the base plate is advanced and retracted and simultaneously, the base plate is raised and lowered to a predetermined degree by the cam grooves of the deck base. A pair of locking projections in contact with a rear end of the caddy is formed at a rear portion of the base plate. Accordingly, due to the physical force being exerted on the caddy, the base plate is moved to the optical disc loading and chucking positions together with the caddy. The base plate so moved is locked by locking means and positioned thereat. In such a situation, information is recorded and/or reproduced on/from the optical disc by the spindle motor and the pickup unit. When the information recording and/or reproducing is completed, an optical disc is ejected by manipulating the eject button. Meanwhile, a guiding slider is disposed at a sidewall of the deck base in a lengthwise direction, to guide the movement of the caddy which is inserted into the deck base. The guiding slider is advanced/retracted in a range of a predetermined stroke, and is elastically supported by a spring in one direction. A lever is disposed at the guiding slider to unlock the base plate. When the physical force is exerted on the guiding slider from the outside, the guiding slider is advanced and unlocks the base plate. The user may operate the guiding slider when the need arises. Accordingly, when the optical disc driving apparatus stops operating due to an abnormality, etc., the user may operate the guiding slider and forcibly withdraw the caddy outward.

According to a second embodiment of the present invention, the optical disc driving apparatus further includes caddy holding means. The caddy holding means holds the cover of the caddy which is withdrawn from the deck base so as to permit an exclusive withdrawal of the caddy tray. The user may operate the caddy holding means as he wishes, and accordingly, the optical disc driving apparatus can be utilized as a caddy-type as well as a tray-type. The caddy holding means comprises a holder movably mounted to a hole defined at the front side of the deck base, having a locking protrusion formed at an upper portion thereof, and the movement projection formed at the front portion thereof to protrude through a movement hole defined at the front panel; and at least one locking elevation formed at respective sides of the back of the caddy cover.

Meanwhile, other objects of the present invention are accomplished by a method of driving an optical disc, including steps of (A) loading an optical disc, wherein a base plate on which a spindle motor and a pickup unit are mounted is moved to optical disc loading and chucking positions by a physical force exerted on the caddy which is inserted into the deck base; (B) locking the base plate which is moved to the optical disc loading and chucking positions; (C) recording and/or reproducing an information by means of the spindle motor and the pickup unit; and (D) unloading the optical disc, wherein the pickup unit is rapidly moved in a radial direction of the optical disc so as to unlock the base plate and to move the base plate to the initial position.

According to one preferred embodiment of the present invention, the method of driving the optical disc further includes an emergency ejection step (E) for forcibly unlocking the base plate so as to forcibly withdraw the caddy when an abnormality occurs during the step (C).

According to another preferred embodiment of the present invention, a method for driving an optical disc further includes a step (F) after the step (D), for holding the cover of the caddy which is withdrawn so as to permit an exclusive withdrawal of the caddy tray out of the deck base.

Since the optical disc driving apparatus of the present invention has an ejection structure employing a manual-type disc loading structure and pickup unit, it requires fewer number of parts in comparison with the conventional one whose disc loading and unloading structure utilizes a loading motor.

Further, according to the optical disc driving apparatus of the present invention, since the structure for a driving force transmission gear train including a loading motor or a plurality of gears are not required, the product can be reduced in size.

Still further, since the optical disc driving apparatus of the present invention can be utilized as a caddy-type as well as a tray-type, the user has the convenience in using the same.

BRIEF DESCRIPTION OF THE DRAWINGS

The above object and advantages will be more apparent by describing the preferred embodiment in greater detail with reference to the drawings accompanied, in which:

FIGS. 13 and 14 are operational diagrams of a base plate which is moved in response to loading/unloading a disc in the optical disc driving apparatus according to the embodiment of the present invention, wherein FIG. 13 shows a state that the caddy is not yet inserted, and FIG. 14 shows a state that the caddy is inserted;

DESCRIPTION OF THE PREFERRED EMBODIMENTS

Figure 1:
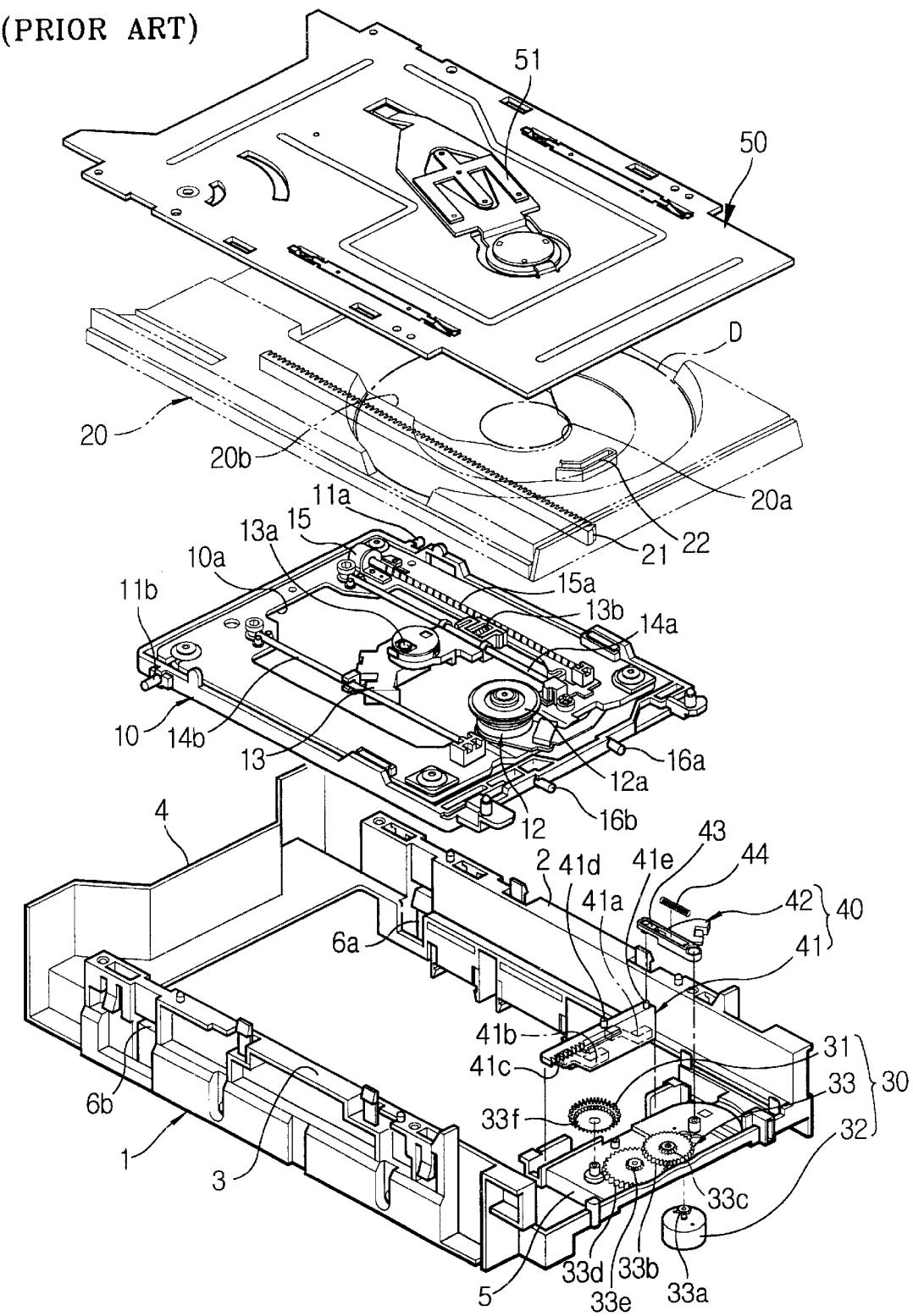
FIG. 1 is an exploded perspective view showing a conventional optical disc driving apparatus.
Figure 2:
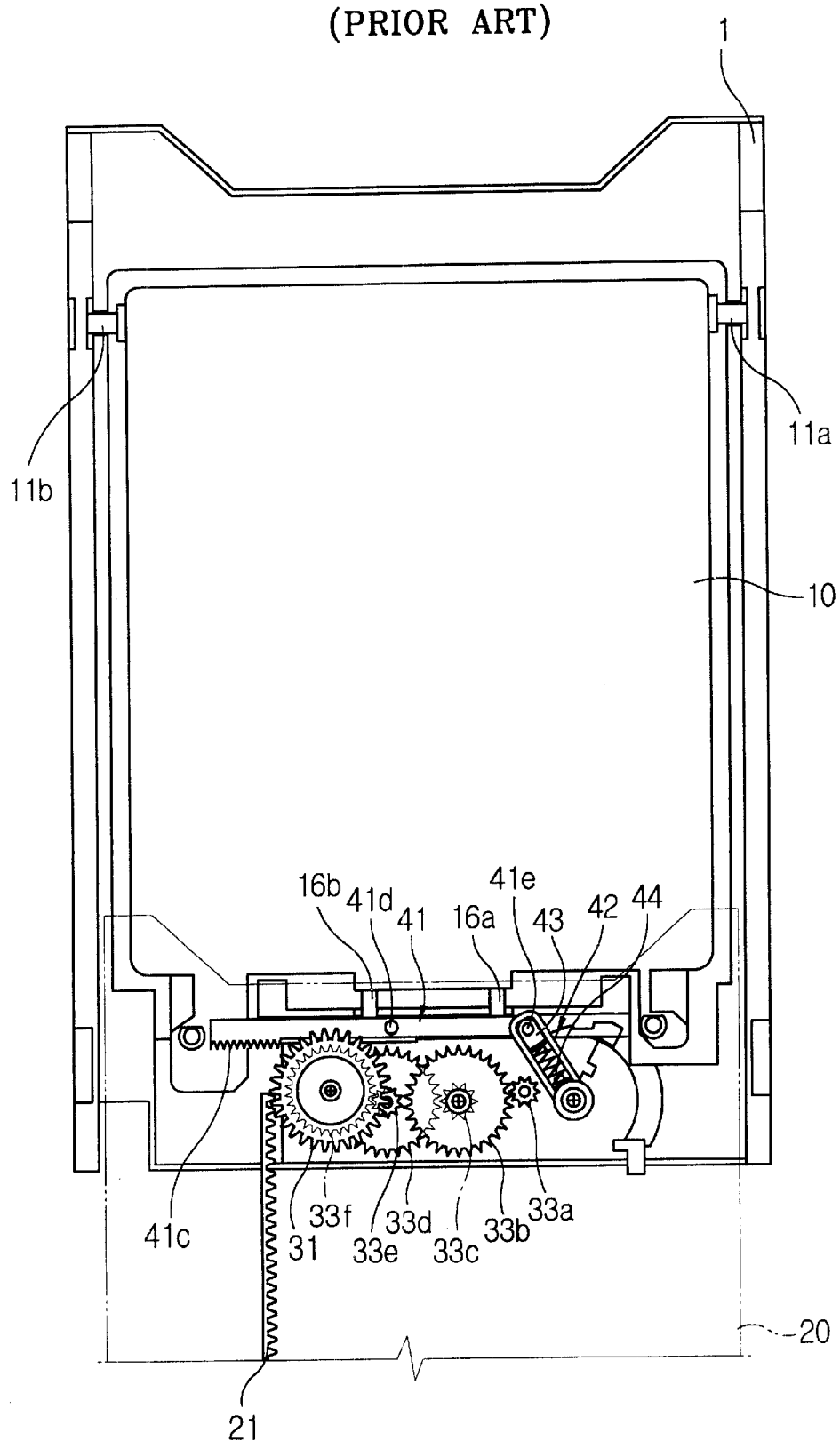
FIG. 2 is a plan view showing the conventional optical disc driving apparatus shown in FIG. 1 from which a tray is withdrawn from a deck base.
Figure 3:
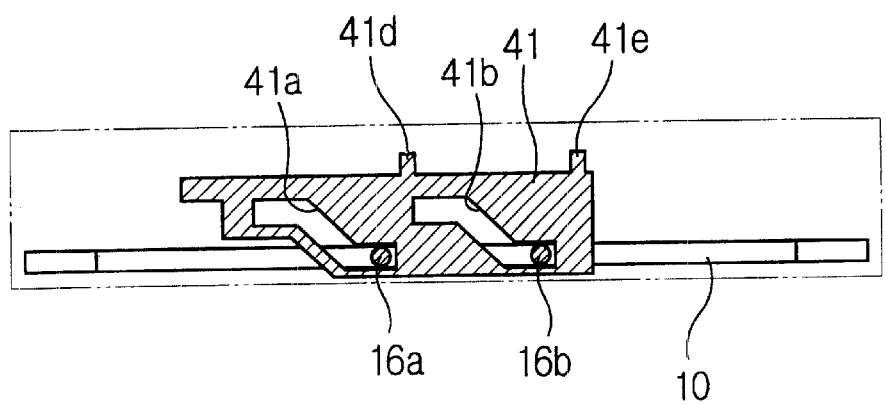
FIG. 3 is a sectional view showing a position of a base plate wherein the tray is withdrawn as shown in FIG. 2.
Figure 4:
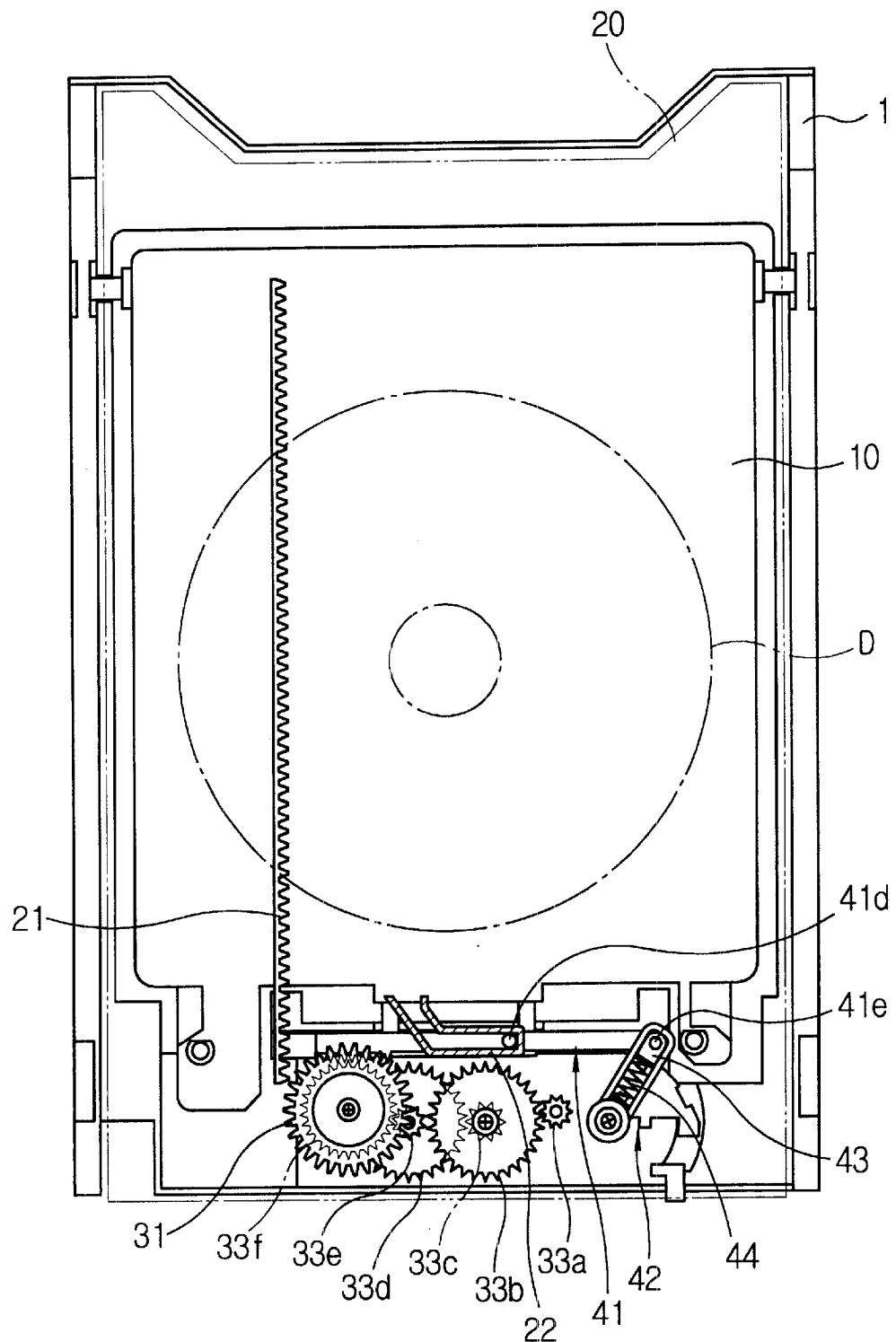
FIG. 4 is a plan view showing the conventional optical disc driving apparatus shown in FIG. 1 in which the tray is inserted into the deck base.
Figure 5:
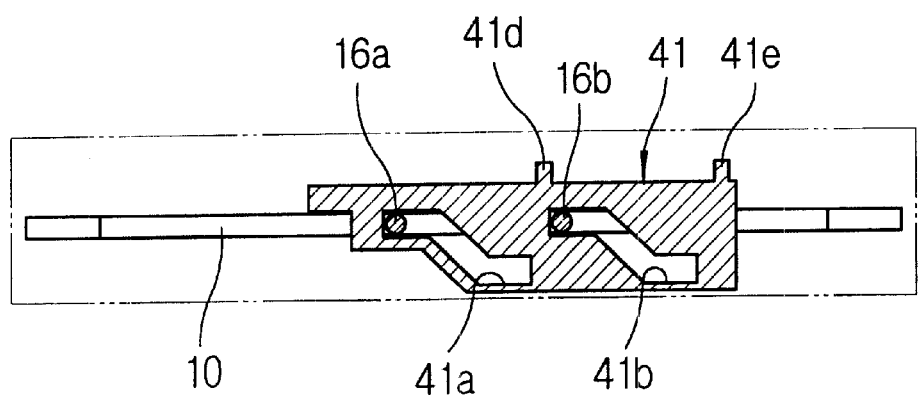
FIG. 5 is a sectional view showing a position of the base plate wherein the tray is inserted as shown in FIG. 4.
Figure 6:
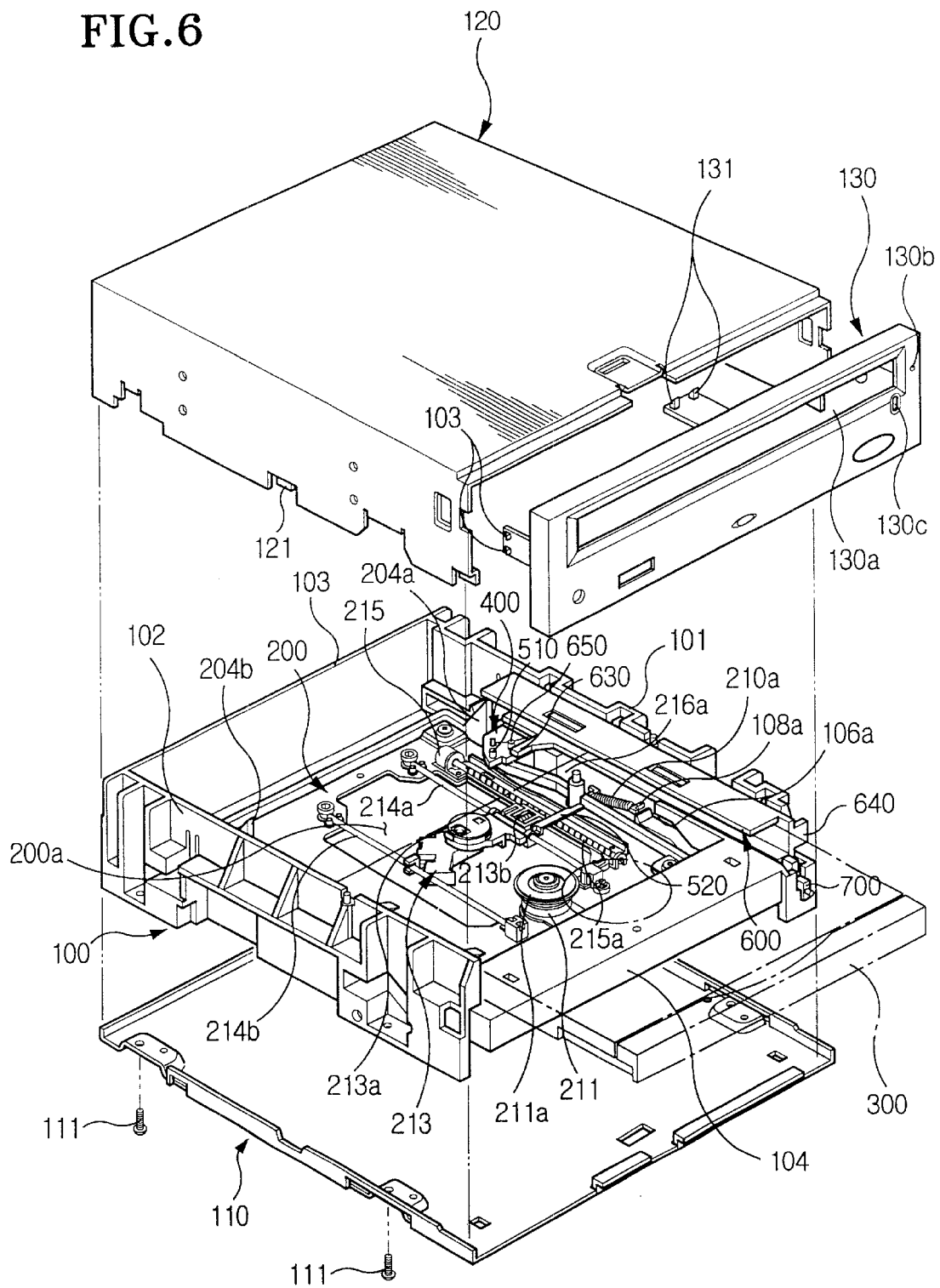
FIG. 6 is a perspective view showing an optical disc driving apparatus of the present invention wherein a disc is unloaded.
Figure 7:
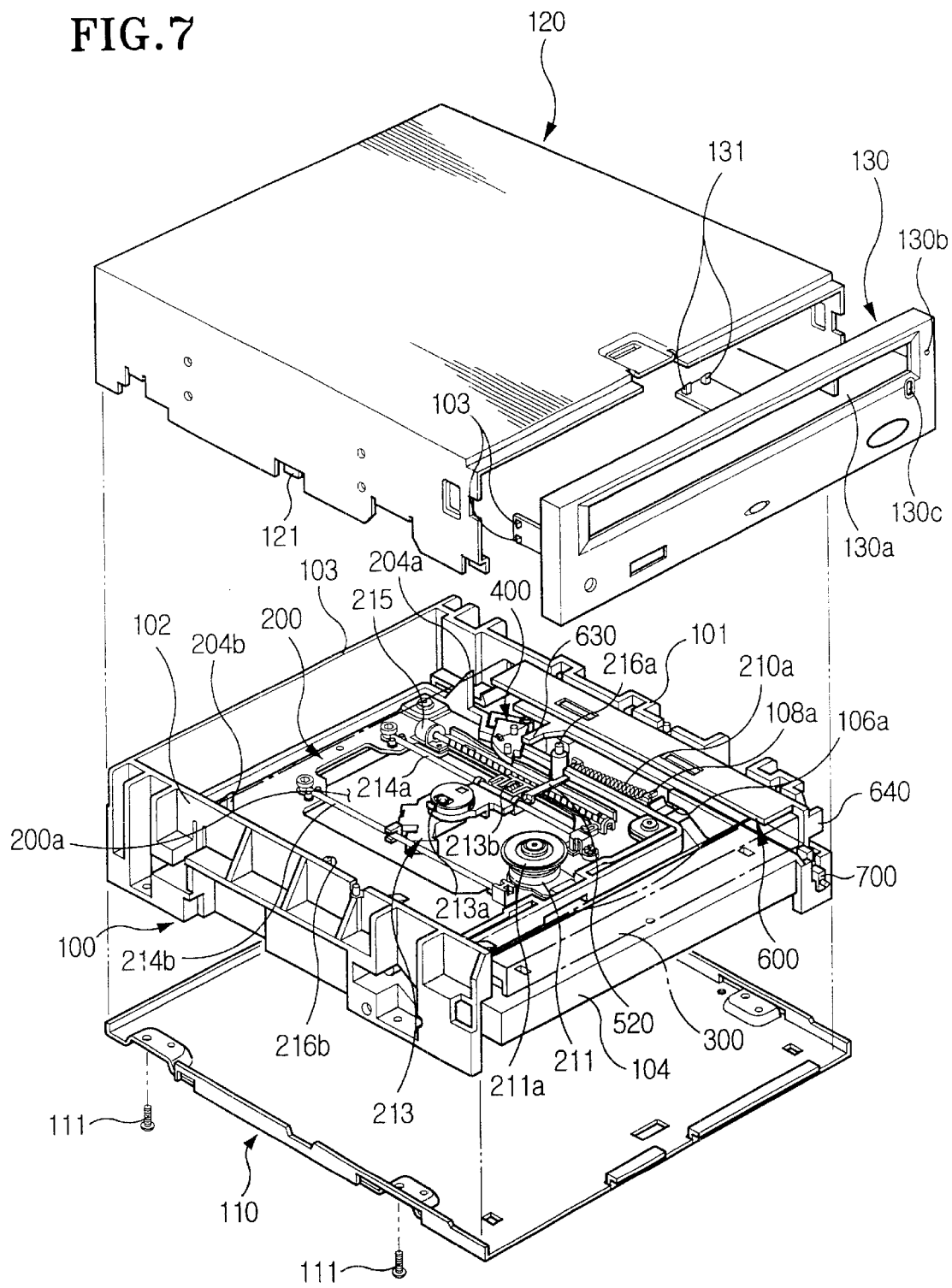
FIG. 7 is a perspective view showing the optical disc driving apparatus of the present invention wherein the disc is loaded.

FIG. 6 shows an optical disc driving apparatus according to one preferred embodiment of the present invention wherein a caddy is withdrawn and an optical disc is unloaded. FIG. 7 shows the state that the caddy is inserted, that is, the optical disc is loaded. Further, FIG. 8 shows a main section of optical disc driving apparatus according to the one preferred embodiment of the present invention.

Figure 8:
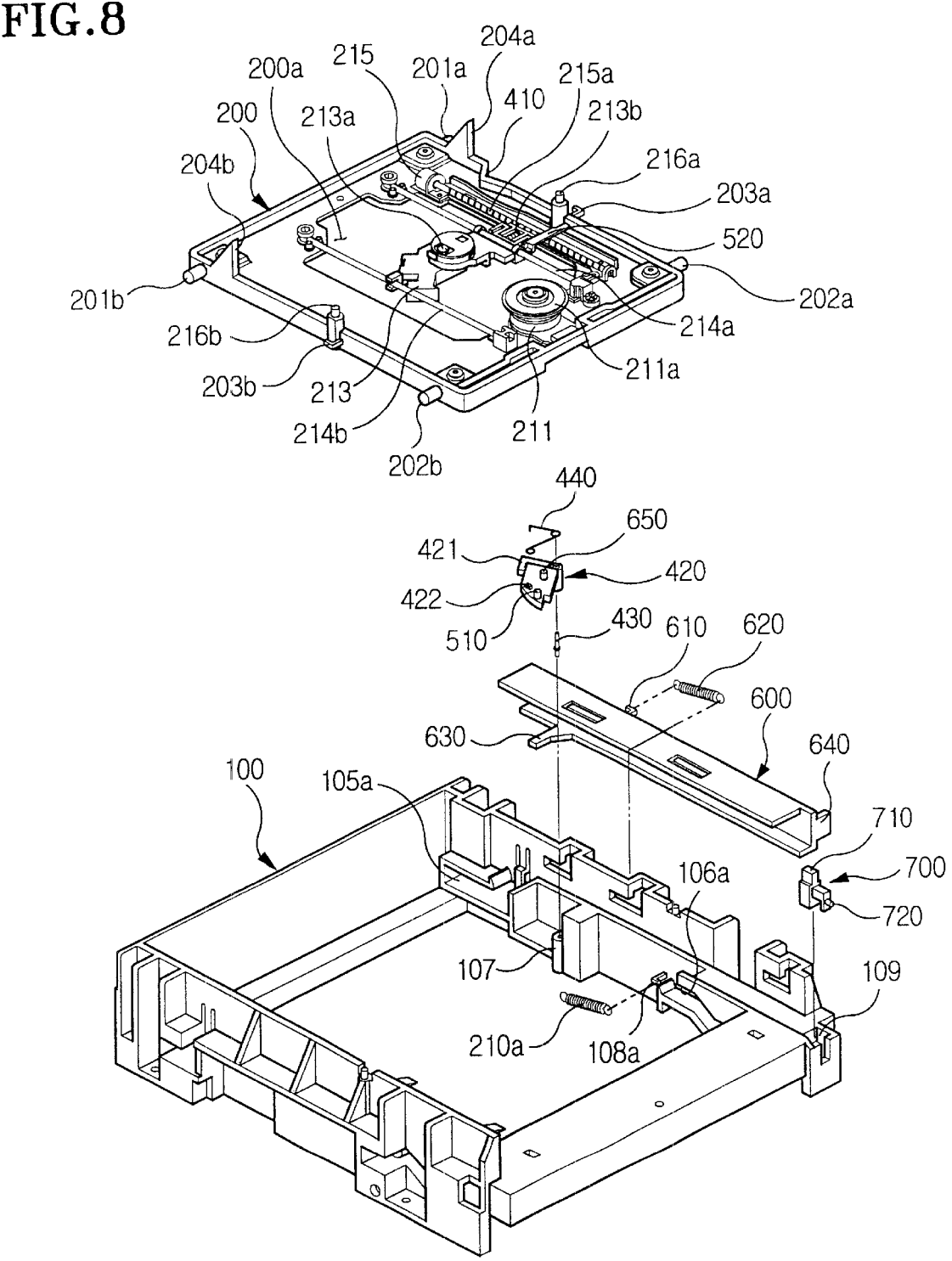
FIG. 8 is an exploded perspective view showing a main section of the optical disc driving apparatus according to the present invention.

As shown in FIGS. 6 through 8, reference numeral 100 designates a deck base, 200 is a base plate, and 300 is a caddy. The deck base 100 has sidewalls 101 and 102 so arranged to face each other, a rear wall 103, and a bottom 104 which has a predetermined width. A lower plate 110 is coupled to a lower portion of the deck base 100, while a cover 120 is coupled to an upper portion of the deck base 100. A front panel 130 having a caddy entrance 130a is coupled to a front portion of the deck base 100. The lower plate 110 is fixed to the deck base 100 by a plurality of screws 111, the upper cover 120 is coupled to the lower plate 110 by a hook assembly 121, and the front panel 130 is coupled to the front surface of the upper cover 120 by a hook assembly 131.

A pair of sliding holes 105a are defined at the sidewalls 101 and 102 of the deck base 100, respectively, facing each other. (Albeit not shown, the sliding hole 105a defined at the sidewall 102 of the deck base 100 has an identical structure with the sliding hole 105a at the sidewall 101). Additionally, a pair of cam grooves 106a are defined at front portions of the sidewalls 101 and 102 of the deck base 100, facing each other. (The cam groove 106a defined at the sidewall 102 of the deck base 100 is not shown, but has identical structure to the cam groove at the sidewall 101). A reference numeral 107 designates a boss, and 108a is a spring holding projection. Further, 130b designates an emergency ejection hole, and 130c is a movement hole.

The base plate 200 is provided with two pairs of holding projections 201a, 201b, 202a, and 202b, and is movably disposed between the sidewalls 101 and 102 of the deck base 100. The first holding projections 201a and 201b are inserted into the sliding holes 105a of the deck base 100, and the second holding projections 202a and 202b are inserted into the cam grooves 106a of the deck base 100, whereby the base plate 200 is slidably mounted to the deck base 100. The base plate 200 which is slidably mounted to the deck base 100 is raised and lowered to a predetermined degree by the cam grooves 106a of the deck base 100 when the base plate 200 is moved. Additionally, the base plate 200 is elastically supported toward the front portion of the deck base 100 by a pair of springs 210a disposed, respectively, between a pair of first spring holding projections 108a and a pair of second spring holding projections 203a and 203b (one of the springs 210a is shown in FIGS. 6, 7, and 8, and the other spring 210a, which is not shown, is disposed opposite thereto). The first spring holding projections 108a are formed at the sidewalls 101 and 102 of the deck base 100, respectively, and the second spring holding projections 203a and 203b are formed at respective opposite sides of the base plate 200. Further, a pair of locking projections 204a and 204b are formed at the rear portion of the base plate 200. The locking projections 204a and 204b contact with the rear end of the caddy 300 which is inserted into the deck base 100. Accordingly, when the rear end of the caddy 300, which is inserted into the deck base 100, contacts the locking projections 204a and 204b of the base plate 200, the base plate 200 begins to be advanced toward the rear portion of the deck base 100 along with the caddy 300. In such a situation, the base plate 200 is raised to a predetermined degree by the cam grooves 106a to be locked with locking means 400 and be positioned thereat. The locking means 400 will be described later.

Meanwhile, a longitudinal opening 200a is defined at the base plate 200, and a spindle motor 211 having a turntable 211a is mounted on the front portion of the base plate 200 adjacent to the longitudinal opening 200a. An optical disc D which is mounted on a caddy 300 to be loaded is chucked with respect to the turntable 211a. A pickup unit 213 is movably disposed along a pair of guiding shafts 214a and 214b which lie across the longitudinal opening 200a in parallel relation to each other. The pickup unit 213 has an optical head 213a. A guiding holder 213b extends from a side of the pickup unit 213. The guiding holder 213b is engaged with a lead screw 215a connected to the stepping motor 215. Accordingly, when the stepping motor 215 is driven, the pickup unit 213 travels along the guiding shafts 214a and 214b.

Figure 9:
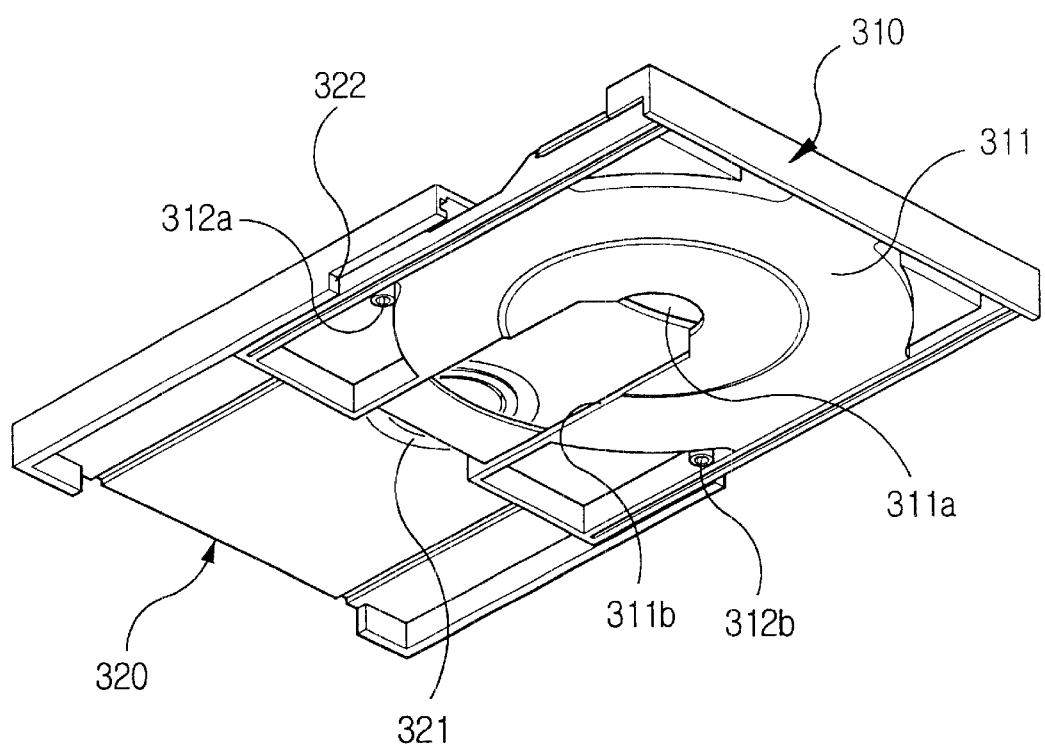
FIG. 9 is a bottom perspective view showing the caddy employed into an optical disc driving apparatus according to the present invention.

As shown in FIG. 9, the caddy 300 is provided with a caddy tray 310 and a caddy cover 320. The caddy tray 310 is slidably coupled to the caddy cover 320. A disc loading section 311 is provided on the caddy tray 310. A receiving opening 311a is defined at the middle portion of the disc loading section 311 to receive the spindle motor 211. A longitudinal opening 311b is designed to intercommunicate with the receiving opening 311a to serve as a travel path for the pickup unit 213. Further, a pair of bosses 312a and 312b having holes for preventing separation are disposed on opposite lower sides of the caddy tray 310. A pair of projections 216a and 216b for preventing separation are projected approximately from the middle portions of the base plate 200 and inserted into the separation preventing holes of the bosses 312a and 312b. Consequently, the caddy 300 which is inserted into the deck base 100 and thus moved to a loading position does not have the caddy tray 310 separated from the caddy cover 320 while moving. A damper 321 is disposed at the middle portion of the caddy cover 320. Additionally, a locking elevation 322 is formed at a lower side of the caddy cover 320. The locking elevation 322 may be formed either at opposite sides of the caddy cover 320, or at one side of the caddy cover 320. The function of the locking elevation 322 will be described later.

Figure 10:
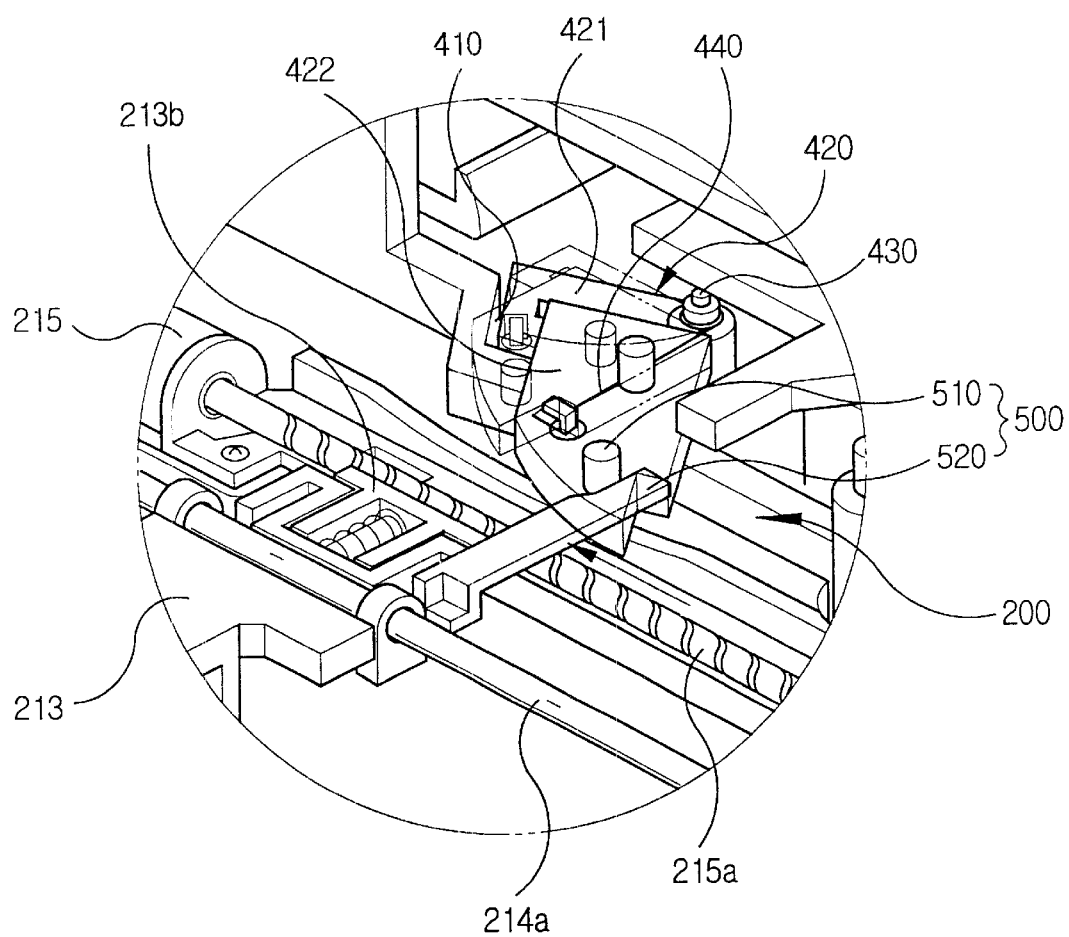
FIG. 10 is a detailed view for showing a structure and operation of unlocking means of a base plate of the optical disc driving apparatus according to the present invention.

As shown in FIG. 10, the locking means 400 includes a locking groove 410 defined at a side of the base plate 200, and a locker 420. The locker 420 has a locking lever 421 selectively inserted into the locking groove 410, and a locking piece 422. The locker 420 is pivotally coupled to the boss 107 formed at the sidewall 101 of the deck base 100 by a pin 430. The locker 420 which is coupled with the boss 107 is elastically supported by a spring 440 in a counterclockwise direction. Initially, when the base plate 200 is in a retracted position, the locking lever 421 of the locker 420 is separated from the locking groove 410 of the base plate 200. Then, when the base plate 200 is advanced and the locking groove 410 reaches the locking lever 421, the locker 420 is rotated in a counterclockwise direction by a retraction force of the spring 440 and the locking lever 421 is inserted into the locking groove 410 so that the base plate 200 is locked.

The base plate 200 which is locked by the locking means 400 is unlocked by unlocking means 500 which is operated in an ejection mode, and the base plate 200 is returned to its initial position by the springs 210a disposed at opposite sides thereof.

As shown in FIG. 10, the unlocking means 500 is provided with a first unlocking projection 510 formed on the locking piece 422 of the locker 420, and a first unlocking lever 520 extending from the pickup unit 213 to be selectively in contact with the first unlocking projection 510. The pickup unit 213 is rapidly moved in a radial direction of the optical disc D in the ejection mode. Therefore, the first unlocking lever 520 pushes the first unlocking projection 510 on the locking piece 422 so that the locker 420 is rotated in a clockwise direction. Accordingly, as shown in FIG. 10, the locker 420 shown in a solid line is rotated by the first unlocking lever 520 to the position shown in a two-dot chain line, and the locking lever 421 is separated from the locking groove 410 of the base plate 200.

Meanwhile, a reference numeral 600 in FIGS. 6, 7, 8, 11 and 12 designates a guiding slider. The guiding slider 600 is disposed at the inner side of the sidewall 101 of the deck base 100 to guide the movement of the caddy 300 which is inserted/withdrawn into/from the deck base 100. The guiding slider 600 is advanced/retracted in a range of a predetermined stroke, and is elastically supported toward the front portion of the deck base 100 by a spring 620 which is disposed between the spring holding projection 610 of the guiding slider 600 and holding projections (not shown) of the sidewall 101 of the deck base 100. Further, a second unlocking lever 630 extends from a side of the guiding slider 600, while a bent press part 640 is formed at the other side of the guiding slider 600.

Figure 11:
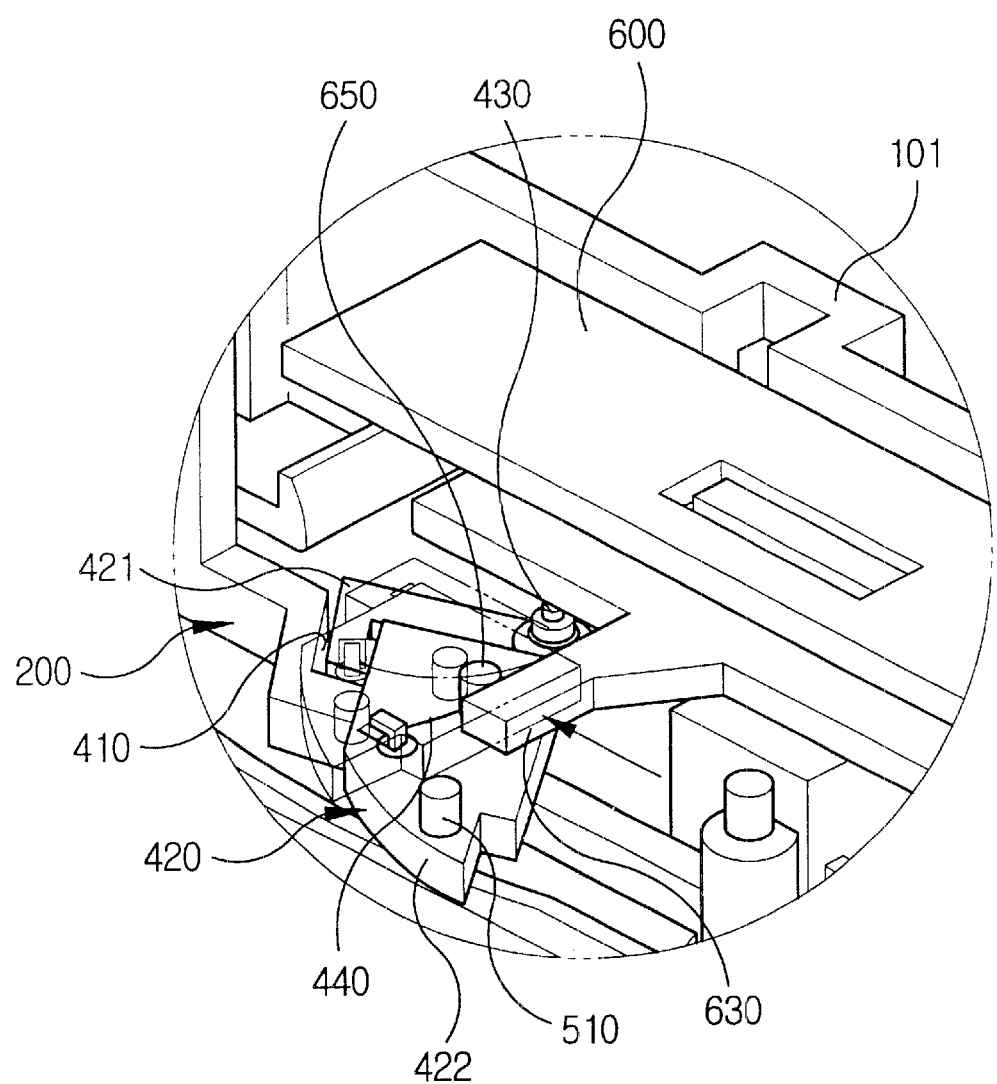
FIG. 11 is a detailed view for showing the structure and operation of emergency ejection means of the optical disc driving apparatus according to the present invention.

The second unlocking lever 630, the press part 640, and the second unlocking projection 650 formed at the locking piece 422 of the locker 420 constitute emergency ejection means. Here, the press part 640 is exposed outward through an emergency ejection hole 130b which is defined at the front panel 130. Accordingly, a user may press the press part 640 of the guiding slider 600 with a pointed device (not shown) through the emergency ejection hole 130b from the outside. When the press part 640 is pressed by the pointed device, the guiding slider 600 is advanced within its predetermined stroke, and the second unlocking lever 630 pushes the second unlocking projection 650 of the locker 420. Accordingly as shown in FIG. 11, the locker 420 is rotated as shown in a double-dot chain line, and the locking lever 421 of the locker 420 is separated from the locking groove 410 of the base plate 200 so that the base plate 200 is unlocked. Such emergency ejection means helps to forcibly withdraw the caddy 300 when the optical disc driving apparatus stops operating due to an abnormality, etc.

Further, according to the present invention, the optical disc driving apparatus has caddy holding means for holding the cover 320 of the caddy 300 which is withdrawn when the disc is ejected by the unlocking means of the emergency ejection means, thereby exclusively withdrawing the caddy tray 310. Therefore, the optical disc driving apparatus of the present invention can be used in a caddy type as well as a tray type.

Figure 12:
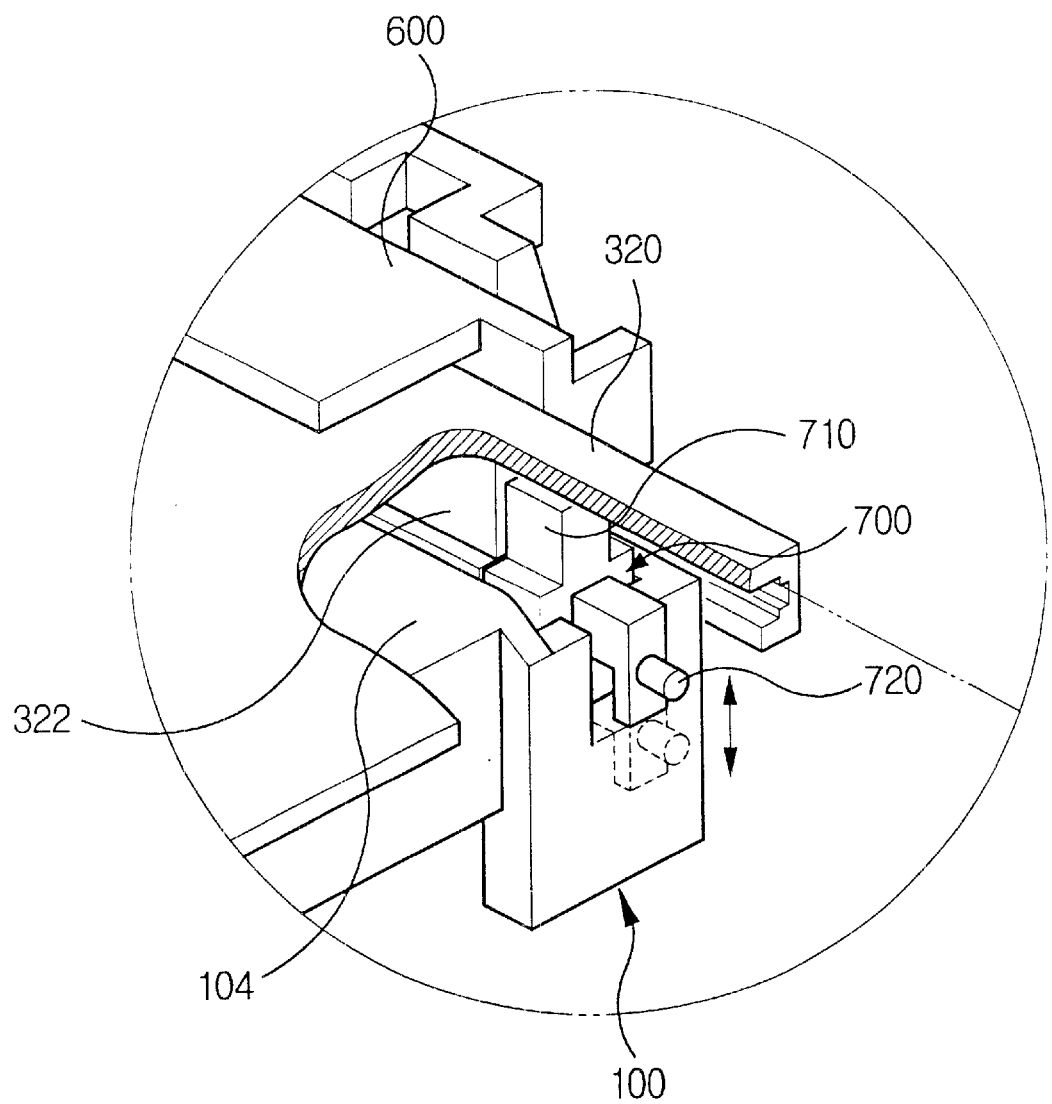
FIG. 12 is a detailed view for showing the structure and operation of caddy holding means of the optical disc driving apparatus according to the present invention.

The caddy holding means, as shown in FIG. 12, has a holder 700, and a locking elevation 322. The holder 700 is disposed at a front side of the deck base 100. The holder 700 is upwardly and downwardly movable. The locking elevation 322 is formed at the caddy cover 320.

A locking protrusion 710 is formed at an upper portion of the holder 700, and a movement projection 720 is formed at a front portion of the holder 700. The movement projection 720 is projected through the moving hole 130c which is defined at the front panel 130. When the holder 700 is moved upward, as shown in FIG. 12, the locking protrusion 710 is raised higher than the bottom 104 of the deck base 100. Consequently, the locking elevation 322 of the caddy cover 320 is locked with the locking protrusion 710, while the caddy 300 is withdrawn, so that the caddy cover 320 is not withdrawn outward. Then, when the caddy tray 310 is pulled, the caddy tray 310 is slid from the caddy cover 320 to be withdrawn outward. Thus, the optical disc D is easily withdrawn from the caddy tray 310 which is withdrawn as described above. Also, the replacement and loading of the optical disc D are conveniently performed.

Hereinafter, a method for driving the optical disc D according to one preferred embodiment of the present invention will be described with reference to FIGS. 13, 14, and 15.

Figure 13:
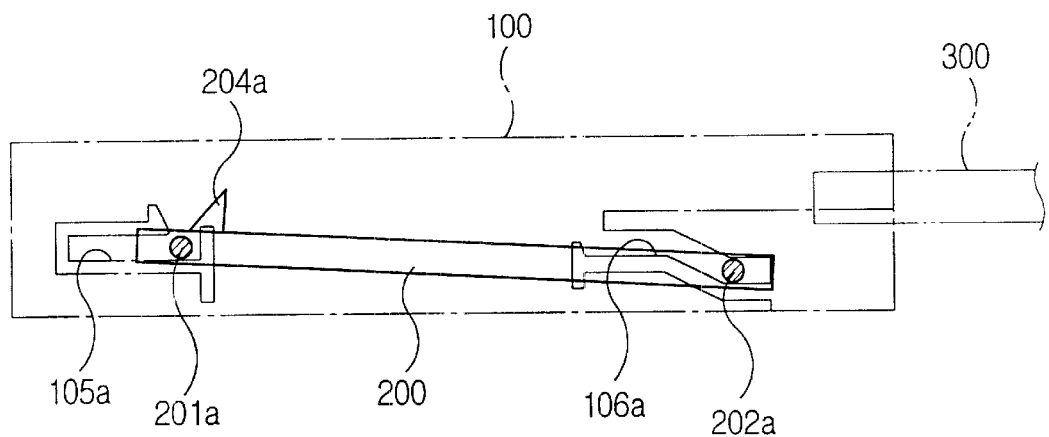
Figure 14:
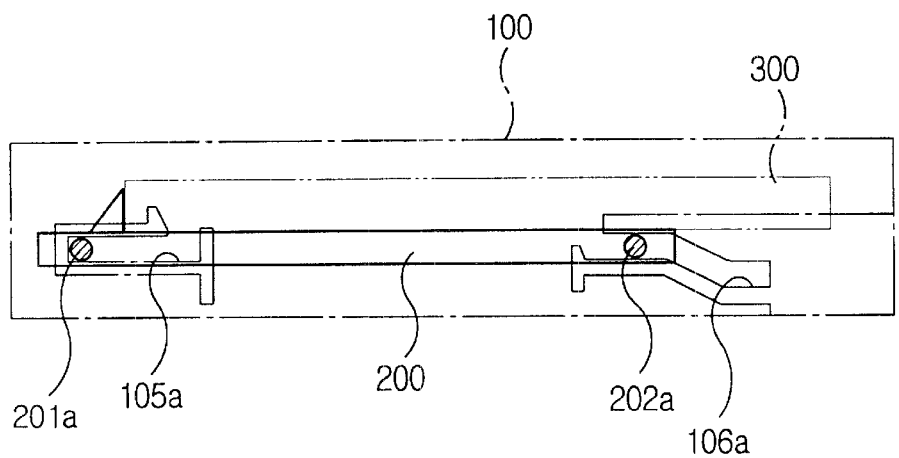

First, in the initial state which is shown in FIG. 13, the caddy 300 is pushed into the deck base 100 by a physical force (Step 61) such as a user's hand. Then, as the rear end of the caddy 300 contacts the locking projection 204a of the base plate 200, the base plate 200 is advanced with the caddy 300 and is locked by the locking means 400 at a predetermined position (Step 62). FIG. 14 shows the optical disc D loaded and chucked. In this situation, information is recorded and/or reproduced on the optical disc by a predetermined signal applied from outside (Step 63).

When the signal for ejection is applied in Step 63 (Step 64), the pickup unit 213 is moved in a radial direction of the optical disc D (Step 65). Accordingly, the first unlocking lever 520 of the pickup unit 213 contacts the first unlocking projection 510 of the locker 420, thereby unlocking the base plate 200 (Step 66). Consequently, the base plate 200 is returned to its initial position by a retraction force of the spring 210a, and the caddy 300 is withdrawn outward (Step 67). Then, the user determines whether to proceed with the operation of the optical disc driving apparatus (Step 68). If the user determines to proceed with the operation of the optical disc driving apparatus, he replaces the optical disc D with a new one and inserts the new disc D' (Step 69) for loading.

The method for driving a caddy-type optical disc has been described as above. Further, the present invention offers a second method for driving a tray-type optical disc which is shown in FIG. 16.

Figure 15:
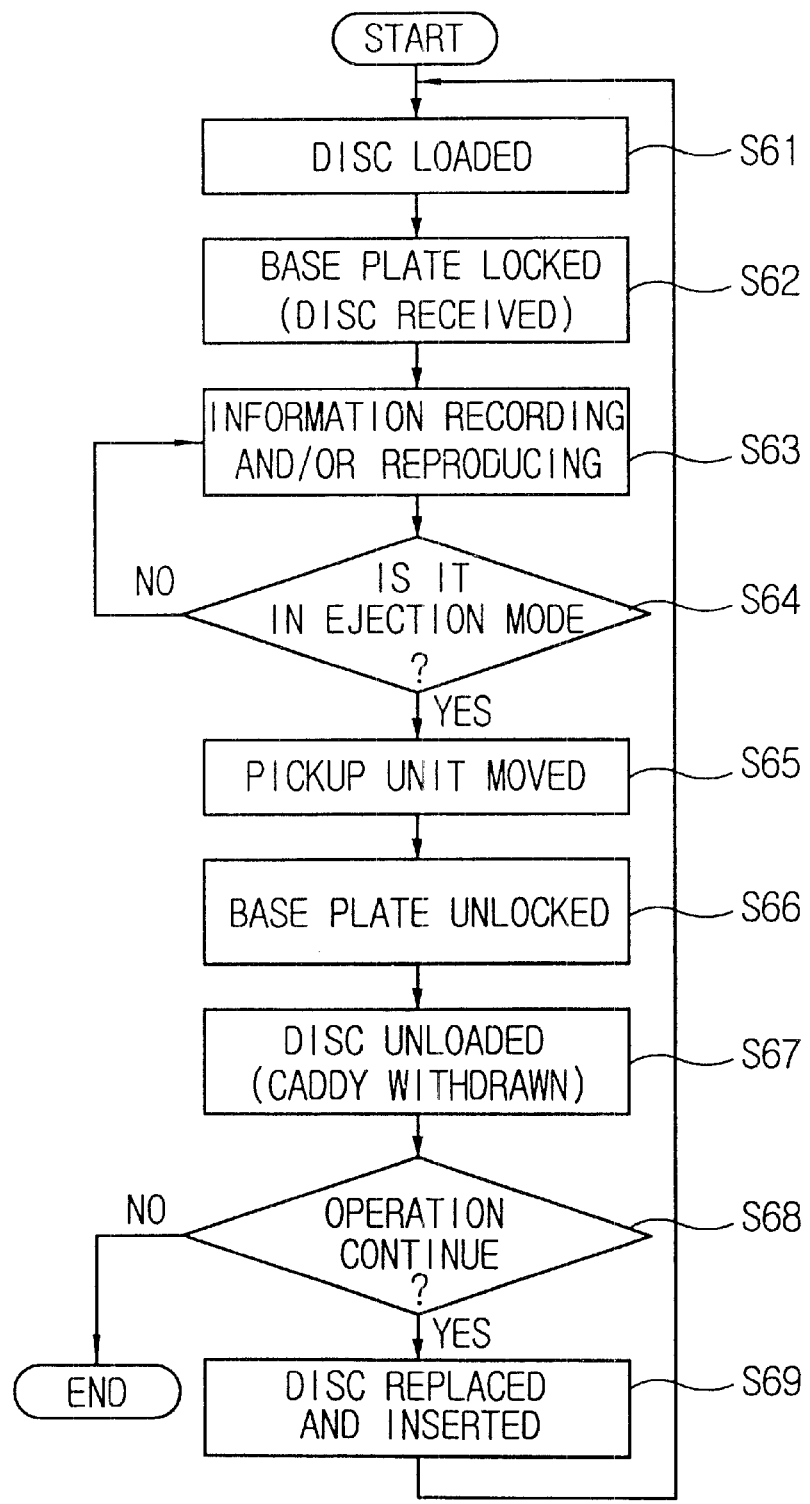
FIG. 15 is a flow chart for explaining the method for driving the optical disc according to one embodiment of the present invention.
Figure 16:
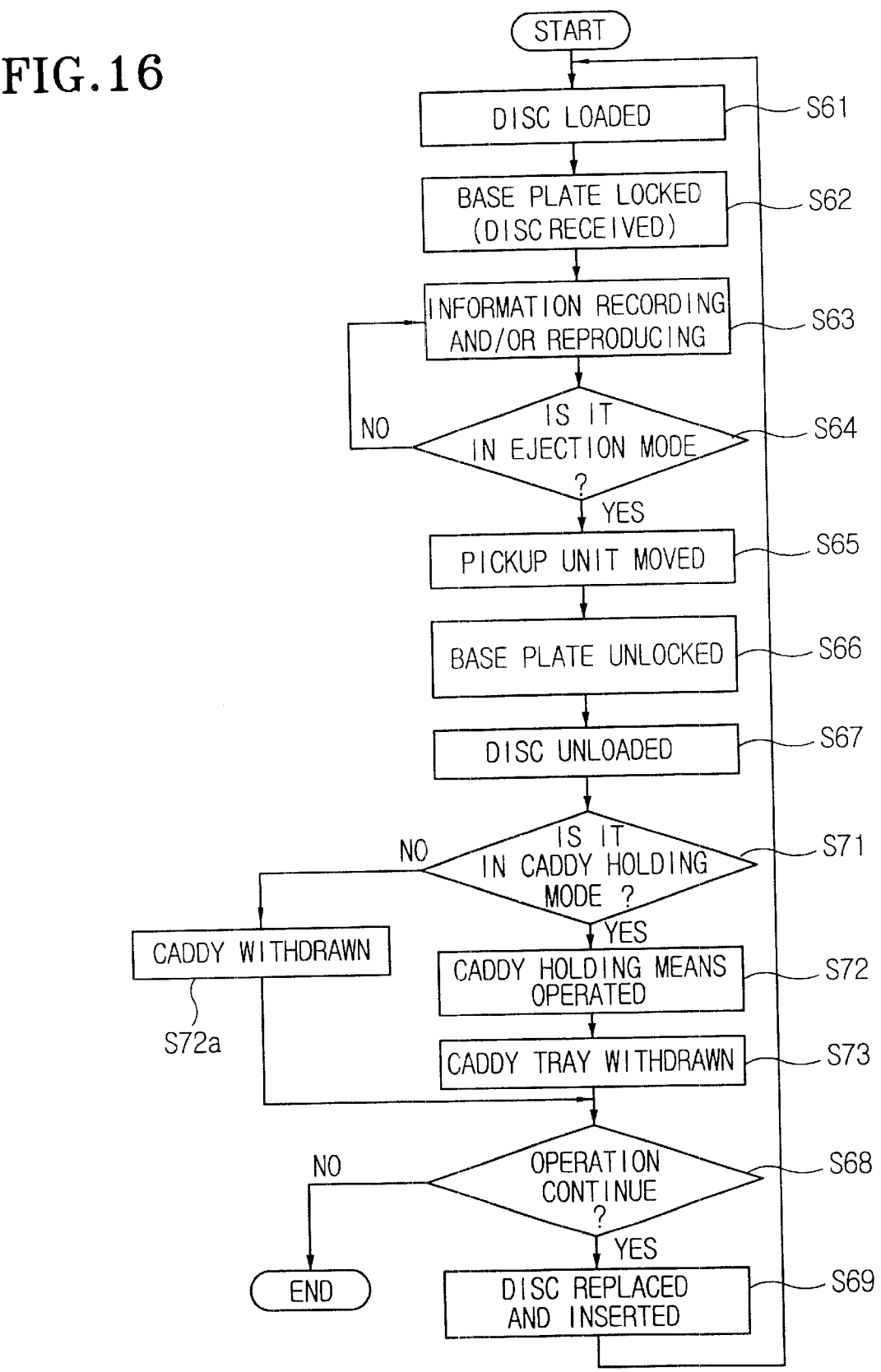
FIG. 16 is a flow chart for explaining the method for driving the optical disc according to another embodiment of the present invention.

As shown in FIG. 16, Steps S61 through S67 occur in the same order as in the first method shown in FIG. 15. According to the second method for driving the tray-type optical disc, following Step S67, it is determined whether the optical disc driving apparatus is in the caddy holding mode (Step 71). When it is determined as a caddy holding mode, then the caddy holding means is operated (Step 72). If not, the caddy 300 is withdrawn (Step 72a') The user may use the caddy holding means at his will. When the caddy holding means is operated, the caddy tray 310 is withdrawn outward but not the caddy cover (Step 73). Since the other steps are identical with those of the method for driving the caddy-type optical disc described above with respect to FIG. 15, like steps have the same reference numerals and further description will be omitted.

Figure 17:
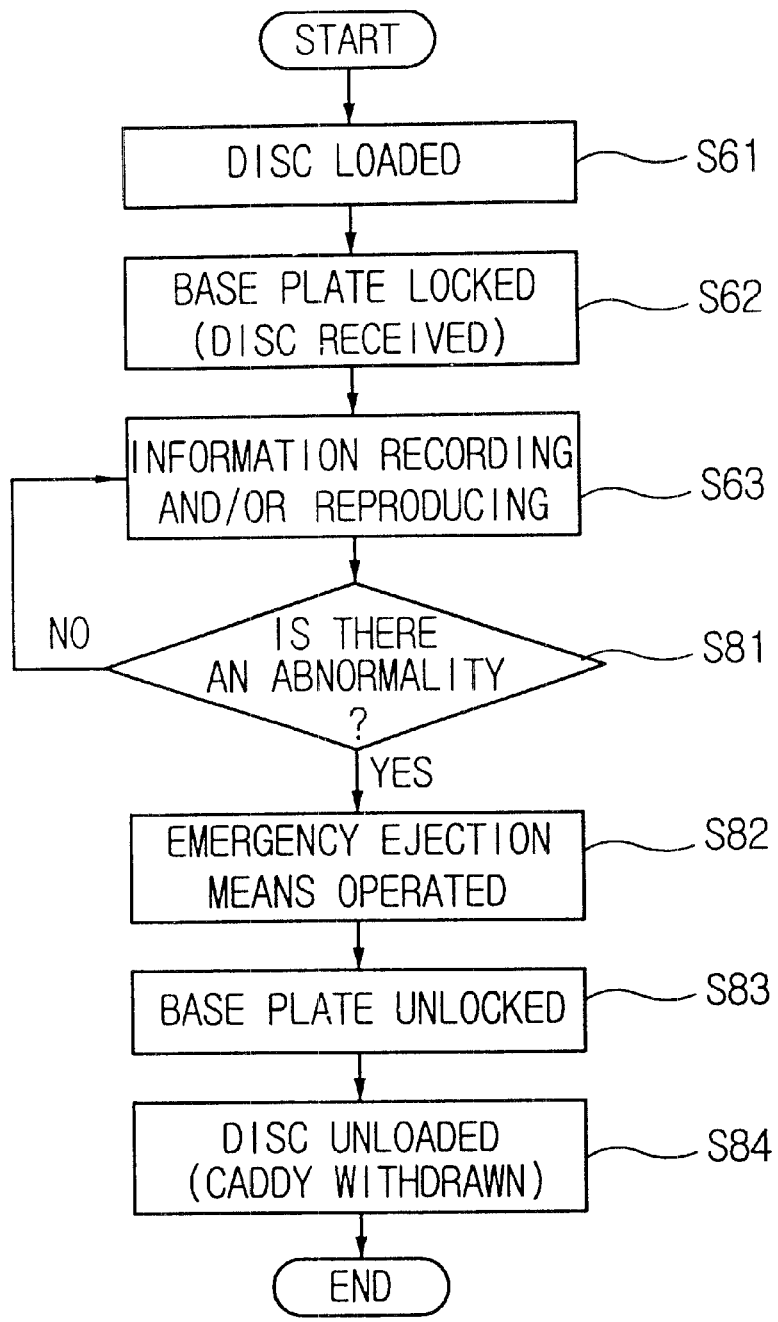
FIG. 17 is a flow chart for explaining the method for driving the optical disc according to yet another embodiment of the present invention.

FIG. 17 is a flow chart for explaining a method for driving the optical disc according to the second preferred embodiment of the present invention, wherein the method for emergency ejection is shown.

The emergency ejection is to protect the optical disc driving apparatus as well as the optical disc by forcibly withdrawing the caddy 300 when the optical disc D driving apparatus stops operating due to an abnormality, etc., during information recording and/or reproducing Steps S61 through S63 are the same as those shown in FIGS. 15 and 16.

As shown in FIG. 17, when the operation of the optical disc driving apparatus is stopped while the information is recorded and/or reproduced (Step 81) (determining whether there is an abnormality), it is detected so that the emergency ejection means is operated (Step 82). Then, the emergency ejection means unlocks the base plate 200 (Step 83) so that the caddy 300 is withdrawn (Step 84). Accordingly, even when the optical disc driving apparatus is stopped by an abnormal cause, the optical disc D is not left in the deck base 100, and therefore, possible damage to the disc and to the optical disc driving apparatus is prevented.

As described above, according to the optical disc driving apparatus of the present invention, since the manual type disc loading structure is employed instead of the loading motor, parts required for loading are reduced. Accordingly, the product has a simpler structure, and requires fewer manufacturing processes and reduces costs, so that the price can be considerably less than previously.

Further, according to the optical disc driving apparatus of the present invention, since the loading motor, the gear train structure, or the like are not employed, less space is required, so that the parts of the optical disc driving apparatus can be efficiently arranged and the product can be made much smaller.

Still further, since the optical disc driving apparatus of the present invention can be used as a caddy-type as well as the tray-type, a user has the convenience of using the same. Also, optical discs of different types can be used by the present invention. That is, according to the present invention, the product has a significantly improved compatibility.

While the present invention has been shown and described with reference to the preferred embodiment thereof, it will be understood by those skilled in the art that various changes in form and details may be effected therein without departing from the spirit and scope of the invention as defined by the appended claims.

What is claimed is:

1. A method of driving an optical disc, comprising:

loading the optical disc, placed on a caddy, into a deck base, and moving a base plate on which a spindle motor and a pickup unit are mounted to an optical disc loading position at which a user loads the optical disc on the caddy and a chucking position at which the optical disc is chucked on the spindle motor by a physical force exerted on the caddy for insertion into the deck base;

locking the base plate which is moved to the optical disc loading and chucking positions;

recording and/or reproducing information on/from the optical disc using the spindle motor and the pickup unit; and unloading the optical disc, by moving the pickup unit in a radial direction of the optical disc so as to unlock the base plate, and then moving the base plate from the chucking position to the loading position.

2. The method as claimed in claim 1, further comprising an emergency ejection step of forcibly unlocking the base plate to withdraw the caddy in response to an abnormality occurring during said recording and/or reproducing information on/from the optical disc.

3. The method as claimed in claim 1, further comprising:

after said unloading the optical disc, holding a cover of the caddy which is withdrawn, to permit exclusive withdrawal of a tray of the caddy out of the deck base.

4. The method of claim 1, wherein:

said locking the base plate comprises locking the base plate using a locking device having an unlocking projection, and said unloading the optical disc comprises moving the optical pickup to contact the unlocking projection so as to unlock the base plate.

5. The method of claim 1, wherein said loading the optical disc comprises:
   moving the caddy to contact projections of the base plate, and
   moving the caddy contacting the projections to move the caddy and the base plate to the chucking position.

6. The method of claim 5, wherein the moving the caddy contacting the projections comprises moving the caddy horizontally while the base plate moves the spindle motor and the optical pickup vertically and horizontally to chuck the optical disc at the chucking position.

7. The method of claim 1, wherein the caddy is detachable from the base plate so as to hold the optical disc while the caddy is not attached to the base plate.

8. A method of driving an optical disc, comprising:
   loading the optical disc, placed on a caddy, in a deck base, and moving a base plate on which a spindle motor and a pickup unit are mounted to an optical disc loading position at which a user loads the optical disc on the caddy and a chucking position at which the optical disc is chucked on the spindle motor by a physical force exerted on the caddy for insertion into the deck base;
   locking the base plate which is moved to the optical disc loading and chucking positions;
   recording and/or reproducing information on/from the optical disc using the spindle motor and the pickup unit;
   unloading the optical disc, by moving the pickup unit in a radial direction of the optical disc so as to unlock the base plate, and then moving the base plate from the chucking position to the loading position;
   forcibly unlocking the base plate to withdraw the caddy in response to an abnormality occurring during said recording and/or reproducing information on/from the optical disc; and
   after said unloading the optical disc, holding a cover of the caddy which is withdrawn, to permit exclusive withdrawal of a tray of the caddy out of the deck base.

9. A method of loading and unloading an optical disc held in an optical disc holder to and from a recording and/or reproduction apparatus, comprising:
   inserting the optical disc holder into a deck base to contact a projection on a base plate on which a spindle motor and a pickup unit are mounted;
   simultaneously moving the optical disc holder and the base plate having the contacted projection to a chucking position at which the optical disc is chucked on the spindle motor;
   locking the base plate at the chucking position using a locking mechanism;
   moving the pickup unit to contact the locking mechanism to unlock the base plate; and
   moving the unlocked base plate from the chucking position to a position at which the optical disc holder is removed from the base plate.

10. The method of claim 9, further comprising:
    recording and/or reproducing data with respect to the optical disc while the base plate is locked at the chucking position;
    detecting an abnormality during said recording and/or reproducing data; and
    upon said detecting the abnormality, unlocking and moving the base plate from the chucking position to the position at which the optical disc holder is removed from the base plate.

11. The method of claim 9, wherein:
    the locking mechanism comprises a locking groove and a locking lever, and
    said locking the base plate comprises advancing the base plate having one of the locking groove and the locking lever to contact the other of the locking groove and the locking lever disposed on the deck base such that the locking lever interlocks with the locking groove.

12. The method of claim 11, wherein said moving the pickup unit comprises moving the pickup unit in a radial direction of the optical disc to move the locking lever of the locking mechanism such that the locking lever is not interlocked with the locking groove so as to unlock the base plate.

13. The method of claim 9, wherein said simultaneously moving the optical disc holder and the base plate comprises, while moving the optical disc holder in a horizontal direction, moving a first end of the base plate in the horizontal direction while moving a second end of the base plate in both the horizontal direction and a vertical direction such that the first and second ends are parallel with the optical disc at the chucking position.

14. The method of claim 13, wherein:
    the first end of the base plate is moved using first grooves disposed horizontally while the second end of the base plate is moved using second grooves disposed at an angle to the horizontal direction, and
    the first and second grooves are disposed in one of the base plate and the deck base.

15. The method of claim 9, wherein:
    the pickup unit is slideably supported on rails to move in a radial direction of the optical disc, and
    said moving the pickup unit comprises sliding the pickup unit on the rails to contact the locking mechanism so as to unlock the base plate.

16. The method of claim 15, wherein:
    the locking mechanism comprises a locking groove and a locking lever,
    said locking the base plate comprises advancing the base plate having one of the locking groove and the locking lever to contact the other of the locking groove and the locking lever disposed on the deck base such that the locking lever interlocks with the locking groove, and
    the sliding the pickup unit comprises sliding the pickup unit to move the locking lever such that the locking lever is not interlocked with the locking groove so as to unlock the base plate.

17. A method of unloading an optical disc held in an optical disc holder from a recording and/or reproducing apparatus, comprising:
    while at a chucking position at which the optical disc is chucked on a spindle motor, moving a pickup unit in a radial direction of the optical disc to contact a locking mechanism to unlock a base plate, where the base plate holds the pickup unit and the spindle motor; and
    moving the unlocked base plate from the chucking position to move the optical disc holder so as to remove the optical disc from the recording and/or reproducing apparatus.

18. The method of claim 17, wherein:

the pickup unit is slideably supported on rails to move in the radial direction of the optical disc, and said moving the pickup unit in the radial direction of the optical disc comprises sliding the pickup unit on the rails to contact the locking mechanism to unlock the base plate.

19. The method of claim 18, wherein:

the locking mechanism comprises a locking groove and a locking lever that interlock with each other while at the chucking position, where the base plate has one of the locking groove and the locking lever and a housing of the recording and/or reproducing apparatus has the other of the locking groove and the locking lever, and the sliding the pickup unit in the radial direction of the optical disc comprises sliding the pickup unit to move the locking lever such that the locking lever is not interlocked with the locking groove so as to unlock the base plate.

20. The method of claim 17, wherein said moving the unlocked base plate comprises, while moving the optical disc holder in a horizontal direction, moving a first end of the base plate in the horizontal direction while moving a second end of the base plate in both the horizontal direction and a vertical direction such that the second end of the base plate is lowered away from the optical disc holder as the optical disc holder moves away from the chucking position.

* * * * *